(12) United States Patent
Bosse et al.

(10) Patent No.: US 9,645,958 B2
(45) Date of Patent: May 9, 2017

(54) METHOD AND DEVICE FOR TRANSMITTING DATA HAVING A VARIABLE BIT LENGTH

(75) Inventors: Carsten Bosse, Ludwigsburg (DE); Dirk Hoppert, Besigheim (DE); Simon Weissenmayer, Marbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 745 days.

(21) Appl. No.: 13/806,556

(22) PCT Filed: Jun. 22, 2011

(86) PCT No.: PCT/EP2011/060435
§ 371 (c)(1),
(2), (4) Date: Mar. 8, 2013

(87) PCT Pub. No.: WO2011/161153
PCT Pub. Date: Dec. 29, 2011

(65) Prior Publication Data
US 2013/0166800 A1    Jun. 27, 2013

(30) Foreign Application Priority Data

Jun. 23, 2010 (DE) .................. 10 2010 030 422
Jun. 14, 2011 (DE) .................. 10 2011 077 493

(51) Int. Cl.
*G06F 13/00* (2006.01)
*G06F 13/14* (2006.01)
(Continued)

(52) U.S. Cl.
CPC .................. *G06F 13/364* (2013.01)

(58) Field of Classification Search
CPC ............ G06F 13/364; G06F 13/4291; G06F 13/4282; H04J 3/24; H04L 2012/40215;
(Continued)

(56) References Cited

U.S. PATENT DOCUMENTS 5,852,406 A * 12/1998 Edde et al. ............... 340/4.2
6,970,115 B1 * 11/2005 Sardi ................... H03M 9/00
341/100
(Continued)

FOREIGN PATENT DOCUMENTS

CN    101300534    11/2008
CN    101494519    7/2009
(Continued)

OTHER PUBLICATIONS

Sheikh, Imran, "Analysis of Overclocked Controller Area Network", IEEE, pp. 1-4.*
(Continued)

*Primary Examiner* — Faisal M Zaman
(74) *Attorney, Agent, or Firm* — Gerard Messina

(57) ABSTRACT

A method for serially transmitting data in a bus system having at least two bus users, which exchange data frames over the bus, the bus users deciding which data frames they receive, as a function of an identifier, the data frames having a logic structure according to the CAN standard, ISO 11898-1, the temporal bit length (L1, L2) inside of a data frame being able to assume at least two different values, the temporal bit length (L1) for at least one first, specified or specifiable region within the data frame meeting the requirements of the CAN standard, ISO 11898-1, the temporal bit length (L2) in at least one second, specified or specifiable region being reduced in comparison with the first region, and a change in the temporal bit length being signaled by the sender, using an identification (310) contained in the same or one of the preceding data frames.

17 Claims, 3 Drawing Sheets

(51) Int. Cl.
*G06F 13/42* (2006.01)
*G06F 13/36* (2006.01)
*G06F 13/362* (2006.01)
*G06F 13/40* (2006.01)
*H04J 3/16* (2006.01)
*H04J 3/22* (2006.01)
*G06F 13/364* (2006.01)

(58) Field of Classification Search
CPC ........... H04L 12/4135; H04L 12/40013; H04L 12/4013; H04L 12/40169; H04L 25/4902
USPC ................. 710/305, 106, 117, 107, 307, 33; 370/468
See application file for complete search history.

(56) References Cited

U.S. PATENT DOCUMENTS

| | | | |
|---|---|---|---|
| 7,466,717 B1* | 12/2008 | Weigl et al. | 370/451 |
| 7,936,854 B2* | 5/2011 | Foley | H04J 3/0685 327/173 |
| 2003/0100980 A1 | 5/2003 | Gruenewald et al. | |
| 2003/0206600 A1* | 11/2003 | Vankka | H04L 5/06 375/261 |
| 2004/0261120 A1* | 12/2004 | Zhang | H03M 7/30 725/129 |
| 2006/0123176 A1* | 6/2006 | Fredriksson | G06F 13/4291 710/305 |
| 2007/0067518 A1* | 3/2007 | Nichols | H04J 3/0641 710/100 |
| 2007/0286225 A1* | 12/2007 | Enders | H04L 12/40032 370/438 |
| 2007/0291856 A1* | 12/2007 | Fastert | H04N 21/4305 375/240.28 |
| 2008/0101398 A1* | 5/2008 | Ojala et al. | 370/412 |
| 2008/0253770 A1 | 10/2008 | Mori | |
| 2009/0150670 A1* | 6/2009 | Taguchi | H04L 63/08 713/169 |
| 2010/0082942 A1* | 4/2010 | Duvalsaint | G06F 9/45533 712/30 |
| 2011/0038388 A1* | 2/2011 | Hartwich | 370/503 |
| 2011/0085575 A1* | 4/2011 | Allie | H01S 3/104 372/38.07 |
| 2012/0071990 A1* | 3/2012 | Asano | H04L 12/40006 700/11 |

FOREIGN PATENT DOCUMENTS

| | | |
|---|---|---|
| DE | 100 00 305 | 7/2001 |
| DE | 101 53 085 | 5/2003 |
| DE | 103 40 165 | 3/2005 |
| DE | 10 2008 000562 | 9/2009 |
| MZ | 103 11 395 | 9/2004 |

OTHER PUBLICATIONS

Sheikh, Imran, "Improving information througput in CAN networks: Implementing the dual-speed approach", pp. 1-6.*

Sheikh, Imran, "Improving Information Througput and Transmission Predictability in Controller Area Networks", IEEE, pp. 1736-1741.*

IEEE Xplore Abstract of previously cited article "Analysis of Overclocked Controller Area Network", retrieved from the Internet on Apr. 6, 2016 at <http://ieeexplore.ieee.org/xpls/abs_all.jsp?arnumber=5573310&tag=1>.*

Robert Bosch GmbH: "CAN with Flexible Data-Rate ; White Paper, Version 1.0".

Apr. 2011, XP000002658095, Retrieved from the Internet : URL :http://www.bosch-semiconductors.de/media/pdf/canliteratur/can_fd.pdf [retrieved on Aug. 31, 2011].

* cited by examiner

METHOD AND DEVICE FOR TRANSMITTING DATA HAVING A VARIABLE BIT LENGTH

FIELD OF THE INVENTION

The present invention relates to a device, a method and an interface for transmitting data between at least two users of a CAN bus system, the temporal duration of the transmitted bits inside of a data frame being able to assume at least two different values.

BACKGROUND INFORMATION

The controller area network and an expansion of the CAN referred to as a time-triggered CAN (TTCAN) are known from the published patent application DE 100 00 305 A1. The media access control method used in the CAN is based on bitwise arbitration. In bitwise arbitration, several user stations may transmit data simultaneously over the channel of the bus system without this interfering with the data transmission. Upon sending a bit over the channel, the user stations may also ascertain the logic state (0 or 1) of the channel. If a value of the sent bit does not correspond to the ascertained logic state of the channel, then the user station terminates the access to the channel. In the CAN, the bitwise arbitration is normally carried out in an arbitration field within a data frame to be transmitted over the channel.

After a user station has completely sent the arbitration field to the channel, it knows that it has exclusive access to the channel. Thus, the end of the transmission of the arbitration field corresponds to a beginning of an available interval, within which the user station may use the channel exclusively. According to the protocol specification of the CAN, other user stations may not access the channel, that is, send data to the channel, until the sending user station has transmitted a checksum field (CRC field) of the data frame. Thus, an end time of the transmission of the CRC field corresponds to an end of the available interval.

The bitwise arbitration allows non-destructive transmission of the data frame over the channel to be achieved. This produces effective real-time characteristics of the CAN, whereas the media access control methods, in which the data frame sent by a user station may be destroyed, due to a collision with a further data frame sent by another station during the transmission over the channel, have a markedly poorer real-time performance, since the collision and the re-transmission of the data frame rendered necessary by it result in a delay in the data transmission.

The protocols of the CAN and of its expansion, TTCAN, are particularly suited for transmitting short messages under real-time conditions. However, if larger data blocks are to be transmitted over a CAN domain, then the relatively low bit rate of the channel becomes a limiting factor. In order to ensure the correct functioning of the bitwise arbitration, a minimum time period dependent on, in particular, the extent of the bus system, the signal propagation speed on the channel, and intrinsic processing times in the interface modules of the bus users, must be maintained for the transmission of a bit, since during the arbitration, all of the bus users must have a uniform picture of the bus state (0 or 1) and equal access to the bus state. Thus, the bit rate cannot easily be increased by reducing the duration of the individual bits.

Nevertheless, in order to be able to transmit sufficiently rapidly a relatively large data block, which is necessary for the programming of a control unit, via a communications interface actually provided for connecting to a CAN domain, DE 101 53 085 A1 provides that for transmitting the data block, the communications interface be temporarily switched over into a different communications mode, in which bitwise arbitration is not carried out and, therefore, a relatively high bit rate is possible. However, in this connection, the communication with the protocols of the CAN must be interrupted for a certain amount of time. If, e.g., due to an error, the operation of the bus system cannot be initiated in accordance with the CAN protocols, then the bus system will stop functioning. In addition, due to the transmission of a relatively large data block, the subsequent transmissions to be carried out according to the CAN protocols are considerably delayed, which means that the real-time characteristics of the CAN are seriously degraded. Therefore, it is not practical to use this method both for programming the control unit at the end of a manufacturing process of a motor vehicle or of the control unit, and during operation of the vehicle.

German patent document DE 103 11 395 A1 discusses a system, which may be switched over between CAN communication and an asymmetric, serial communications protocol and allows a higher transmission rate in the asynchronous mode. However, this protocol is outside of the CAN standard.

German patent document DE 103 40 165 A1 discusses improved synchronization between sensors and actuators within a CAN network. This reduces the latency times, but the transmission rate is not increased.

SUMMARY OF THE INVENTION

The object of the present invention is to provide a method, as well as a device and an interface, by which larger quantities of data may be transmitted relatively rapidly in a CAN network and real-time conditions may be maintained during the transmission of messages over the bus. This object is achieved by the data transmission method having the features of Claim one, as well as by the device and interface described in the independent claims.

The above-described object of the present invention is achieved in that for a limited period of time, in particular, after arbitration has occurred, the bit length, i.e., the temporal duration of the bits, within a data frame is reduced in comparison with the value used for the arbitration. In other words, for a limited section inside of the data field of the transmitted data frame, the clock-pulse rate of the bus is increased in comparison with the base clock-pulse rate. In this connection, the clock-pulse rate may also assume, in principle, several different, increased values, and the instants for switching over between these values may lie anywhere within the data frame. In completely general terms, the clock-pulse rate may assume any characteristic, provided that the bus users have a uniform understanding of this characteristic and may thus interpret the information contained in the data frames in a standard manner.

The fact, that a data frame has, in at least a subsection, a bit length changed according to the present invention, must be communicated to the receiver, in order that it can interpret the sent data correctly. The message to the receiver takes place via an identification. In this connection, it may be advantageous to use stored values dependent on the identification, for the bit length and the times of the change in the bit length. An example of this would be an identification via a set bit still available inside of the header region of the data frame; for one of the two possible values of this bit, a bit length reduced by a factor set for all of the bus users being used, for example, in the complete data field.

Inside of the identification or at another fixed position inside of the data frame, another option is to transmit information regarding the bit length and/or the times of the change in the bit length to the receiver. For example, a reduction factor or reduction divisor for the bit length could be transmitted as a whole number in the first three bits of the data field, and the bit length multiplied by the factor could be used, after a set switchover time, for the remaining duration of the data field.

In one further advantageous specific embodiment, the identification is sent in a preceding data frame, and in this manner, it is indicated to at least one bus user that a subsequent data frame sent to it will have a reduced bit length.

It is further advantageous when at least an SOF bit and arbitration field of the data frame have a bit length, which corresponds to the base clock-pulse rate of the bus. In this case, depending on the result of the arbitration, the bit length may be selectively reduced in only the sender and receiver of the currently transmitted data frame, and energy, which would be necessary for producing the corresponding increase in the sampling frequency in all of the bus users, is saved. The other bus users, which do not switch over their bit length, are then temporarily unable to participate in the communication.

In order to use the devices, which execute the method of the present invention, in both bus systems whose users continually maintain a bit length corresponding to the base clock-pulse rate, and in bus systems whose users may operate with a bit length reduced according to the present invention, it is further advantageous to design the devices to be switchable, for example, via a suitable input. The devices operating according to the present invention may then be used in a flexible manner in old and new networks.

In order to prevent the bits transmitted with a reduced bit length from causing errors in bus users that do not switch over their bit length, or to prevent an erroneous resynchronization onto the edges of the bits transmitted with a reduced bit length, it may be advantageous that in the method described, in the case of one or more bus users, in particular, in the bus users that do not switch over their bit length, the resynchronization is discontinued at least during the transmission of data having a reduced bit length. For example, a bus system could have full nodes and Eco nodes as bus users, the full nodes being configured to switch over the bit length, using suitable devices, such as higher-quality oscillators, while the Eco nodes are only able to use the normal bit length. If a full node sends a message having a shortened bit length, then, for example, the Eco nodes discontinue their communication as of the last long bit and also no longer carry out a bit resynchronization.

It is possible to render the suspension of the resynchronization dependent on the detection of an imminent reduction in the bit length, for example, using a dependence on the identifier of the data frame, or on the result of the arbitration and/or on a suitable identification. The Eco nodes re-initiate the communication, when they observe a recessive bus state for a specifiable time period, for example, for ten slow bit lengths, which corresponds to an end-of-frame having three subsequent intermission bits. Then, an inaccurate, inexpensive and energy-saving oscillator is sufficient for the corresponding detection.

In the following, the present invention is set forth and explained in further detail in view of the drawings.

DETAILED DESCRIPTION

In the following, exemplary embodiments of the method and the device of the present invention are described. These concrete examples are used for explaining the implementation but do not limit the scope of the inventive idea.

Figure 1:
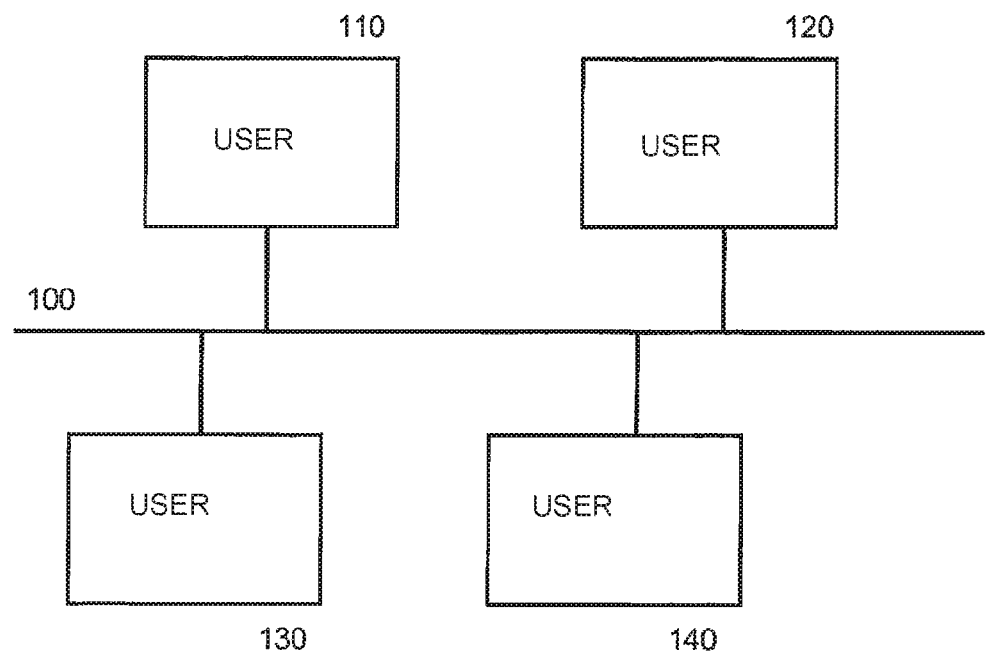
FIG. 1 shows a CAN bus system from the related art, having several users that may exchange data frames over the bus.

FIG. 1 shows a CAN bus 100 from the related art, including several users 110, 120, 130, 140 as illustrated in FIG. 1. Data frames are exchanged between the users in accordance with the CAN standard, ISO 11898-1. The bus has, for example, a clock-pulse rate of 500 kBaud; that is to say, the bit length is, in this example, 2 µs.

Figure 2A:
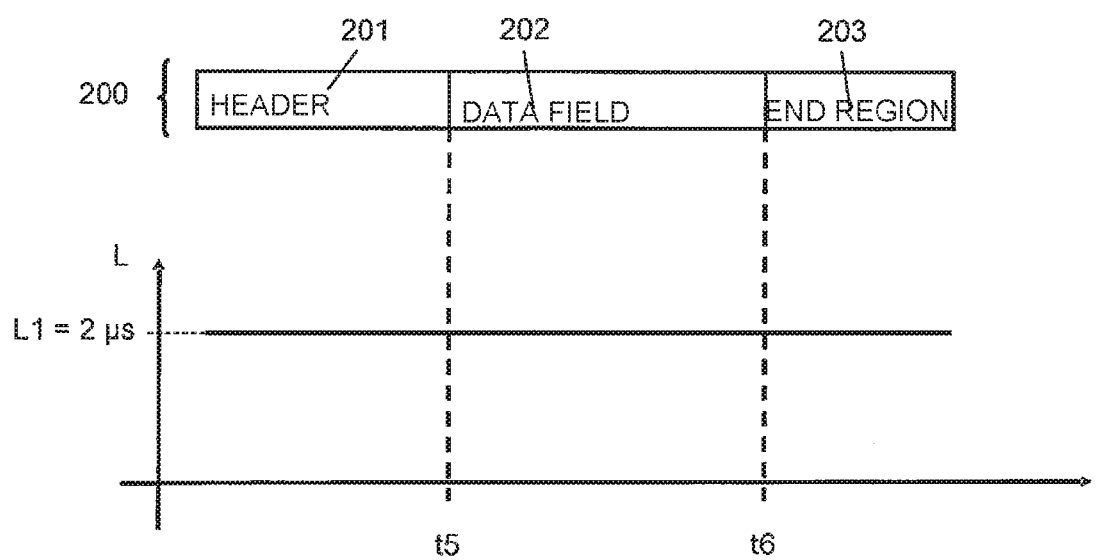
FIG. 2a schematically shows the structure of a data frame according to the CAN standard, ISO 11898-1.

FIG. 2a shows the schematic structure of a data frame 200, which may be transmitted over bus 100. In principle, the data frame may be subdivided into a header region 201 (normally made up of the fields "start of frame," "arbitration field," and "control field"), as well as a data field 202 and an end region 203 (normally made up of a CRC field, ACK field and "end of frame"). In the case represented here, the transmission of the data field begins at time t5, and the transmission of the end region begins at time t6. The clock-pulse rate is constant for the entire data frame.

Figure 2B:
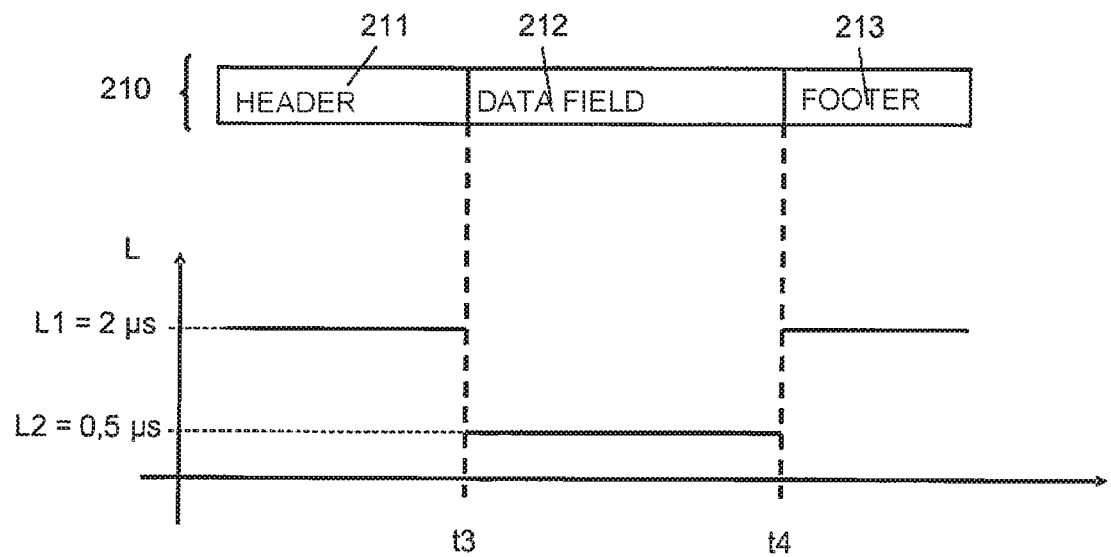
FIG. 2b schematically shows the structure of a data frame, including the partitioning into regions of variable bit length according to the present invention.

FIG. 2b shows an example of the different structure of a data frame 210 according to the present invention, including header region 211, data field 212 and footer region 213. Additionally represented are times t3 and t4, which indicate the beginning and the end of switching over the bit length. In the case represented here, the clock-pulse rate is increased, for example, by a factor of 4 for the entire data field, and the bit length is reduced by the inverse factor to 0.5 µs. Accordingly, time t3 coincides with the beginning of the data field of the data frame t5, and time t4 coincides with the beginning of the end region of the data frame t6. However, in a different embodiment, times t3 and t4 may also be situated at other positions, for instance, inside of the data field.

Figure 3:
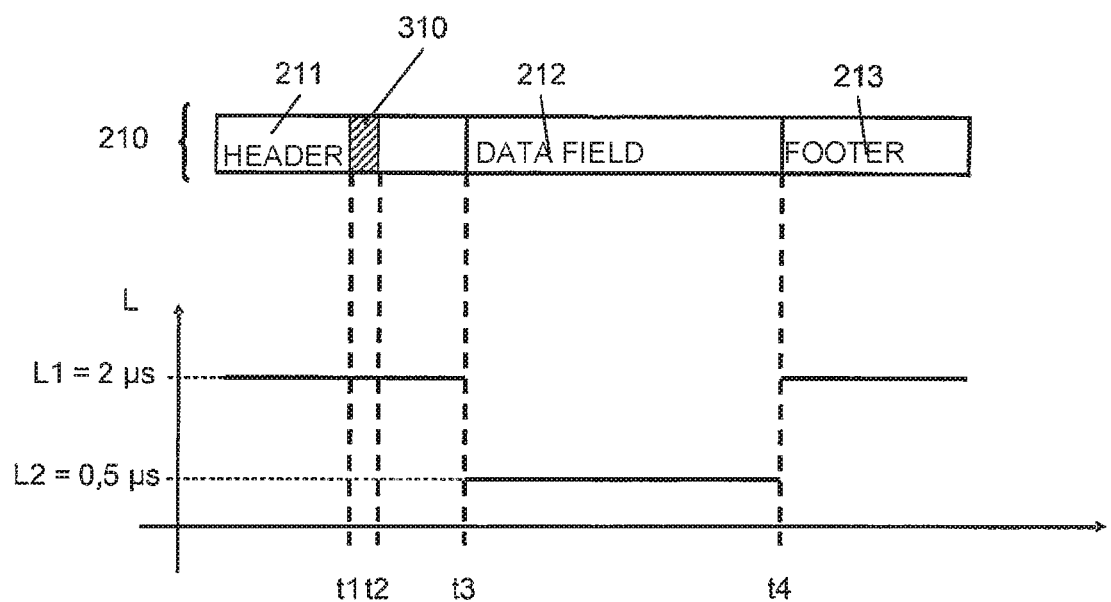
FIG. 3 illustrates an example of the temporal position of the identification within the data frame, by which the necessary information about the change in the bit length is communicated to the receiver.

FIG. 3 shows, once more, the structure of a data frame 210 of the present invention. The position of identification 310 of the present invention inside of the header region of the data frame is also illustrated by way of example. In the embodiment shown here, one or more bits inside of the header region could be used for the identification. For example, a reserved bit could be used as an identification of the bit length reduced by a factor of four. In this case, the indicated times t1 and t2 would be the start and end of the reserved bit, and as before, times t3 and t4 correspond to the beginning and end of the switching-over of the bit length.

A special case of the identification of the present invention is the option of setting the reduced bit length used for the transmission, as a function of the identifier of the data frame within the scope of the definition of the CAN matrix. If, while setting it, the potential senders and receivers of the specific data frame are known, then it is also known if all of the senders and receivers are configured for a message having the given identifier for using the reduced bit length, that is, if they are so-called "full nodes," or if they are not configured for this, that is, if they are "Eco nodes." Depending on this, it may then be established that data frames, which have particular identifiers or are made up of a group of identifiers, in particular, the ones that are only exchanged between full nodes, use a reduced bit length in a stipulated region. This is then communicated to the specific receivers by only the identifier itself.

A further option that is, however, not explained here in further detail is to send identification 310 in a preceding data frame and, in this manner, to indicate to at least one bus user, that a subsequent data frame sent to it will have a reduced bit length. In this case, the identification does not have to be sent along in each data frame of the present invention, but only one time or sporadically.

Figure 4A:
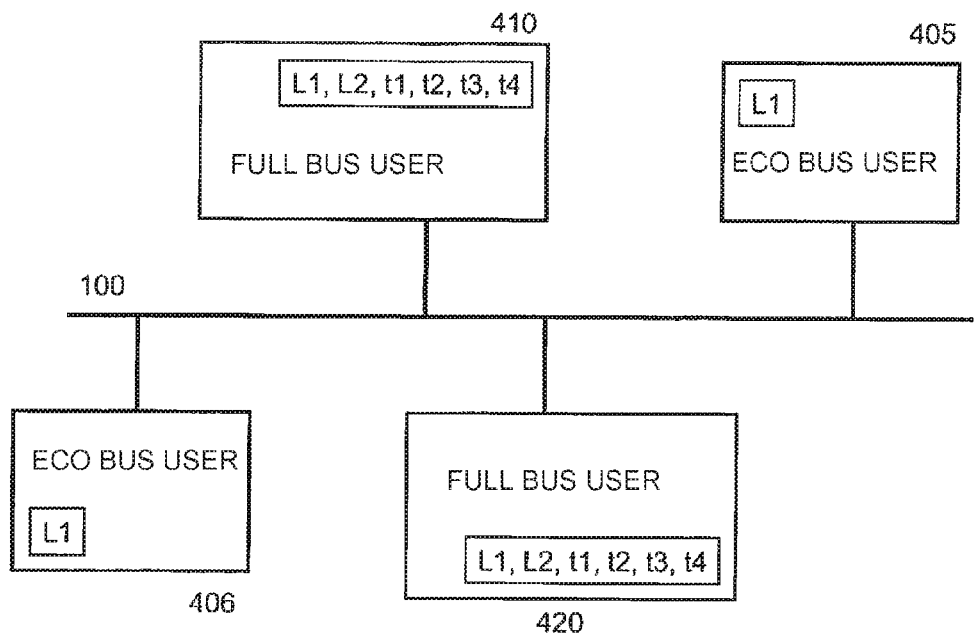
FIGS. 4a and 4b show different options for distributing the necessary information about the change in the bit length between data frames and bus users of the present invention.
Figure 4B:
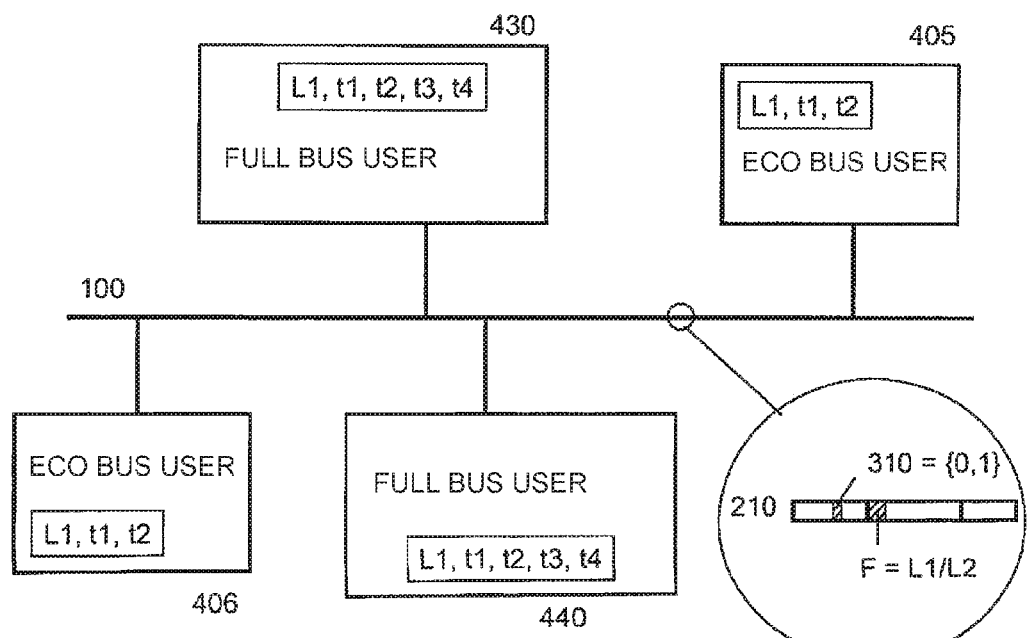

FIGS. 4a and 4b relate to the information content of the identification. In this case, for different types of data frames, there is the option of storing the information about the specific characteristic of the bit length inside of the data frame in the bus users, and transmitting only an information item regarding type within the scope of the identification. Alternatively, characteristic quantities, which describe the reduction in the bit length, may also be sent with the identification.

In the case illustrated, there are only two types of data frames, and only one bit of data frame 210 is used as identification 310, in order to switch over between type A (e.g., data frame having a uniform bit length according to the CAN standard, as in FIG. 2a) and type B (e.g., data frame having a bit length in the data field shortened by a factor of 4, as in FIG. 2b). Eco bus users 405 and 406, which send and/or receive data frames of the type A, know the standard bit length L1. Full bus users 410 and 420, which send and/or receive data frames of the type B, know the two values of the occurring bit lengths L1 and L2, the position of the identification [t1, t2], and the starting and ending times t3 and t4 of the region having a reduced bit length, adapt their sending and receiving characteristics in a suitable manner. In order to be able to possibly interrupt the reception temporarily and switch off the bit resynchronization, Eco users 405 and 406 additionally know the position of the identification [t1, t2]. The dependence of the present invention's reduction in the bit length on the identifier of the data frame, which was discussed in connection with FIG. 3b, also requires knowledge of the identifying region [t1, t2] in users 405 and 406; in this case, the identifying region being implicitly in the identifier of the data frame.

Of course, it is also possible that only data frames of the type B are used on the bus and, accordingly, that all of the bus users are defined as full users and adjust their sending and receiving characteristics to a shortened bit length.

Another option is illustrated in FIG. 4b. In this case, in addition to identification 310, portions of the information about the change in the bit length may also be transmitted, in particular, the factor F, by which the data transmission rate of the bus is to be increased and the bit length is to be reduced. In this example, full bus users 430 and 440, which send and/or receive data frames of the type B, know the position of the identification [t1, t2] and the starting and ending times t3 and t4 of the region having a reduced bit length, calculate the changed bit length as $L2 = L1/F$ and adapt their sending and receiving characteristics in a suitable manner. For example, by using the first three bits of the data field, eight different factors F, such as the values between 1 and 8, could be transmitted, and the bit length could be correspondingly switched over at a defined time after reception of the factor, for example, at the fourth or fifth bit of the data field.

In the exemplary embodiments represented by FIGS. 4a and 4b, the method may be implemented in such a manner, that a switchover of the sampling rate takes place exactly when a type-B data frame having a reduced bit length is transmitted. In this case, it is necessary for the knowledge of the reduced bit length to have arrived at the receiving bus user in a timely manner. Thus, in particular, the identification must be transmitted prior to the region having a reduced bit length, thus, in the example shown, temporally prior to the data field, either in the same or a preceding data frame.

Furthermore, it is also possible that only some of the users, in particular, only the specific sender and receiver, execute the switchover of the sampling rate, when a type-B data frame having a reduced bit length is transmitted.

To execute the method, full nodes have, for example, a higher-quality oscillator, whereas for cost savings, a correspondingly more expensive oscillator may be dispensed with in the Eco nodes. For the Eco nodes, the resynchronization may be switched off in the time frame in which data having a reduced bit length are transmitted, in order to prevent incorrect resynchronization on edges of the bus signal, which may occur due to the transmission of the data frames having a reduced bit length. In the Eco nodes, the receiving operation may also be completely interrupted, and, for example, an energy-saving quiescent state may be assumed, in which, for instance, voltage is not applied to some modules of the Eco node. This switching-off and/or interruption may be rendered dependent on the detection of an imminent reduction in the bit length. The identification of the data frames according to the present invention may be utilized for this, that is, upon detection of an identification 310, which signals a type-A data frame having a shortened bit length, the Eco bus users would switch off the resynchronization or communication for this data frame.

They re-initiate the resynchronization or communication, for example, when they observe a recessive bus state for a specifiable time period, for example, for ten slow bit lengths, which corresponds to an end-of-frame having three subsequent intermission bits.

It would also be possible for a classification of the data frame according to type (in the case represented by way of example, as type A or type B) to be stipulated within the scope of the definition of the CAN matrix, depending on, for example, whether the sender and the receiver of the specific data frame are full nodes or Eco nodes; and for the resynchronization for the type-B data frames determined in this manner to be switched off. To this end, the corresponding address lists or filters in the bus users would have to be provided with the corresponding information item regarding the type.

What is claimed is:

1. A method for serially transmitting data in a bus system having at least two bus users, which exchange data frames over the bus, the bus users deciding which data frames they receive, as a function of an identifier, the method comprising:

reducing a temporal bit length in at least one second, specified or specifiable region in comparison with the first region; and signaling a change in the temporal bit length by the sender, using an identification contained in the same or one of the preceding data frames;

wherein the data frames have a logic structure according to CAN standard ISO 11898-1, wherein the temporal bit length inside of a data frame is at least one of two different values, the temporal bit length for at least one first, specified or specifiable region within the data frame meeting the requirements of the CAN standard ISO 11898-1, and wherein for a limited period of time after an arbitration has occurred, a temporal duration of the bits, within a data frame, is reduced in comparison with a value used for the arbitration;

wherein the identification is sent in a preceding data frame, and using the identification, at least one bus user is informed that a subsequent data frame sent to it will have a reduced bit length.

2. The method of claim 1, wherein the identification is situated inside the first specified or specifiable region of the indicated data frame.

3. The method of claim 1, wherein the first region includes at least the SOF bit and the arbitration field.

4. The method of claim 2, wherein the identification is derived from portions or the entirety of the identifier of the indicated data frame.

5. The method of claim 2, wherein the identification is carried out, using a single bit inside of the first region.

6. The method of claim 1, wherein the temporal bit length may assume exactly two different values.

7. The method of claim 1, wherein in addition to the identification, at least one information item is transmitted, from which the bit length to be used in the at least one second region is derivable.

8. The method of claim 1, wherein the first region includes several bits of the data frame, and the at least one information item is transmitted in these bits.

9. The method of claim 1, wherein a first group of bus users implements a reduction in the bit length as a function of the identification, and a second group of bus users discontinues the bit resynchronization and/or interrupts the receiving operation and/or assumes a quiescent state as a function of the identification.

10. The method of claim 9, wherein the first group of bus users includes all of the bus users, which are configured as full nodes and are therefore configured for using the shortened bit length.

11. The method of claim 9, wherein the first group of bus users includes all of the bus users, which are configured as full nodes and are therefore configured for using the shortened bit length, and which are either senders or receivers of the data frame just transmitted.

12. A device for serially transmitting data in a bus system having at least two bus users, which exchange data frames over the bus, the bus users deciding which data frames they receive, as a function of an identifier, comprising:

a reducing arrangement to reduce a temporal bit length in at least one second, specified or specifiable region in comparison with the first region; and a signaling arrangement to signal, by the sender, a change in the temporal bit length, using an identification contained in the same or one of the preceding data frames;

wherein the data frames have a logic structure according to CAN standard ISO 11898-1, wherein devices are provided for switching over the temporal bit length inside of a data frame between at least two different values, the temporal bit length for at least one first, specified or specifiable region within the data frame meeting the requirements of the CAN standard ISO 11898-1, and wherein for a limited period of time after an arbitration has occurred, a temporal duration of the bits, within a data frame, is reduced in comparison with a value used for the arbitration;

wherein the identification is sent in a preceding data frame, and using the identification, at least one bus user is informed that a subsequent data frame sent to it will have a reduced bit length.

13. The device of claim 12, wherein the identification is situated inside the first specified or specifiable region of the indicated data frame.

14. A device for serially transmitting data in a bus system having at least two bus users, which exchange data frames over the bus, the bus users deciding which data frames they receive, as a function of an identifier, comprising:

a signaling arrangement to signal, by the sender, a change in the temporal bit length by the sender, using an identification contained in the same or one of the preceding data frames; and devices for at least one of discontinuing a bit resynchronization and interrupting the receiving operation and/or assuming a quiescent state as a function of the identification;

wherein the data frames have a logic structure according to CAN standard ISO 11898-1, and wherein for a limited period of time after an arbitration has occurred, a temporal duration of the bits, within a data frame, is reduced in comparison with a value used for the arbitration;

wherein the identification is sent in a preceding data frame, and using the identification, at least one bus user is informed that a subsequent data frame sent to it will have a reduced bit length.

15. The device of claim 14, wherein the bit resynchronization is discontinued and/or the receiving operation is interrupted and/or a quiescent state is assumed, if, in light of the identification, it is detected that in at least two regions, the data frame containing the identification has at least two different values of the bit length.

16. The device of claim 15, wherein the bit resynchronization is discontinued and/or the receiving operation is interrupted and/or a quiescent state is assumed, if, in light of the identifier, it is detected that the data frame indicated by the identifier is not required to be received.

17. The device of claim 12, wherein the device is configured to be switchable by an input signal and is switchable over between a behavior according to the CAN standard ISO 11898-1.

* * * * *